(12) United States Patent
Kuti et al.

(10) Patent No.: US 9,927,108 B2
(45) Date of Patent: *Mar. 27, 2018

(54) CUSTOMIZABLE MODULAR LUMINAIRE

(71) Applicant: General Electric Company, Schenectady, NY (US)

(72) Inventors: Andras Kuti, Budapest (HU); Roland Batai, Budapest (HU); Norbert Kovacs, Budapest (HU); Daniel Lorincz, Budapest (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/368,716

(22) Filed: Dec. 5, 2016

(65) Prior Publication Data
US 2017/0138579 A1    May 18, 2017

Related U.S. Application Data

(63) Continuation of application No. 14/068,672, filed on Oct. 31, 2013, now Pat. No. 9,546,776.

(51) Int. Cl.
| F21V 21/00 | (2006.01) |
| F21V 23/04 | (2006.01) |
| H04N 5/225 | (2006.01) |
| F21V 15/01 | (2006.01) |
| G06K 9/00  | (2006.01) |
| F21W 131/103 | (2006.01) |
| F21Y 115/10 | (2016.01) |

(52) U.S. Cl.
CPC .......... F21V 23/0471 (2013.01); F21V 15/01 (2013.01); H04N 5/2257 (2013.01); *F21W 2131/103* (2013.01); *F21Y 2115/10* (2016.08); *G06K 9/00785* (2013.01)

(58) Field of Classification Search
CPC ...... F21S 4/001; F21S 4/003; F21W 2121/00; F21W 2121/004; F21W 2131/103; F21Y 2101/02; F21K 9/00; F21V 29/004; F21V 15/01; H05B 33/0803; H05B 33/0827; H05B 33/0809; H05B 33/0821; H05B 41/3925; H05B 41/2828; H05B 41/28; H05B 41/2827; H05B 41/2855
USPC .................................................... 362/249.02
See application file for complete search history.

(56) References Cited

U.S. PATENT DOCUMENTS

| 2012/0206050 A1* | 8/2012 | Spero ................. B60Q 1/04 315/152 |
| 2013/0035901 A1* | 2/2013 | Breed ................. B60J 7/0573 702/188 |

* cited by examiner

*Primary Examiner* — Minh D A
(74) *Attorney, Agent, or Firm* — Peter T. DiMauro; GE Global Patent Operation

(57) ABSTRACT

A luminaire having a body that includes a first portion and a second portion, the second portion including two or more apertures. At least one of the two or more apertures being sized to match a main lighting component, at least one other of the two or more apertures being sized to match a first function module, and at least another of the two or more apertures being sized to match a second function module. One of the first function module and the second function module is one of a motion detector, a camera, an air pollution sensor, and a communication unit.

9 Claims, 2 Drawing Sheets

CUSTOMIZABLE MODULAR LUMINAIRE

CROSS REFERENCE

This application is a continuation of commonly-owned, co-pending patent application Ser. No. 14/068,672, filed 31 Oct. 2013, which is hereby incorporated by reference in its entirety.

BACKGROUND

A luminaire (i.e., light fixture) is a complete lighting unit that can include one or more lamps, corresponding sockets to hold the lamps, wiring, and often a diffuser cover or reflector that distributes the light beam over a spatial region.

Municipalities often provide luminaires suspended from a pole along a roadside to illuminate the road. Different traffic conditions on the road could benefit from different lighting methods and illumination levels. For instance, an area with high density traffic might not benefit from using a motion sensor to trigger the luminaire, as the light would have a high duty cycle. In such traffic density areas, the inclusion of a motion sensor would be an unnecessary increase to the cost of the luminaire. However, in low density traffic areas, the inclusion of a motion sensor could result in savings in electrical cost and energy consumption, through a lower lighting duty cycle.

To accommodate the various requirements of different traffic areas, municipalities can procure varying luminaires with multiple configurations. These multiple configurations vary based on the needs of the area where the luminaire is to be installed. Ordering, tracking, and installing these varied luminaires can increase the procurement, and overall costs to the municipality.

BRIEF DESCRIPTION

In accordance with embodiments, a customizable modular luminaire includes a luminaire body having a top portion and a bottom portion. The bottom portion includes two or more apertures that accept lighting component(s), motion sensor(s), camera module(s), and/or other functional devices. One lighting component can be a main light emitting diode (LED) module that emits a broad lighting pattern to light, for example, a portion of a roadway. Other lighting component(s) can be LED module(s) with more directive lighting pattern for lighting sidewalks, bicycle paths and the like. Packaged within the housing can be LED driver module(s) and communication modules. In one implementation, the driver and/or communication modules can be mounted in the apertures on the bottom portion of the luminaire body. In accordance with embodiments, the lighting modules can be other than LED technology (e.g., halogen, fluorescent, incandescent, mercury lamp, etc.).

DETAILED DESCRIPTION

Figure 1:
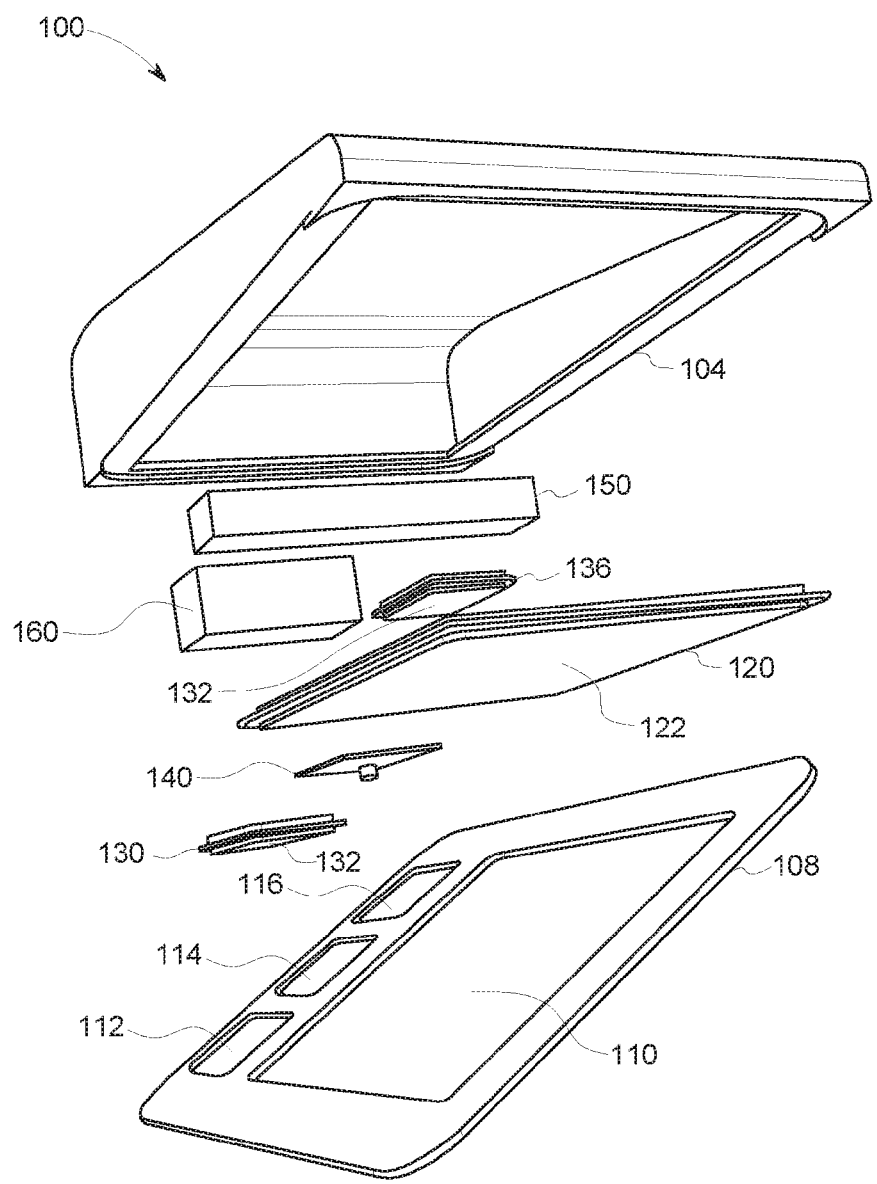
FIG. 1 depicts an exploded view of a customizable modular luminaire in accordance with an embodiment.

FIG. 1 depicts an exploded view of luminaire 100 in accordance with embodiments. Luminaire 100 can include a body having first body portion 104 and second body portion 108. The luminaire second body portion can include two or more apertures 110, 112, 114, 116. The apertures are sized to fit correspondingly-sized function modules. These function modules can be lighting component(s), motion sensor(s), camera module(s), communication module(s), and/or other functional devices.

In accordance with embodiments, aperture 110 can be sized to accommodate main lighting module 120 that emits a broad lighting pattern to light, for example, a portion of a roadway. One side of lighting module 120 can include diffuser 122 that shapes the light beam pattern emitted from the lighting module. Main lighting module 120 can generate light from a variety of lighting technologies including a halogen light source, a LED light source, a fluorescent light source, etc. Electrical component 150 can include electrical circuitry to provide the electrical input to the lighting technology of the main lighting module (e.g., a ballast, transformer, driver circuit, etc.)

Aperture 112, 114, 116 can be sized to accept correspondingly-sized function modules. In accordance with embodiments, secondary lighting module 130 can be inserted into one of the aperture(s). Secondary lighting module 130 can include diffuser 132 that shapes the light beam pattern emitted from the secondary lighting module to light a sidewalk, bicycle path, etc. which is adjacent to the roadway.

In one implementation the secondary light module beam pattern can have a wide, longitudinal light distribution shape. In accordance with embodiments, more than one secondary lighting module can be installed into second body portion 108. For example, secondary lighting module 136 can be used to light another region of the sidewalk and/or bicycle path, or some other surface altogether.

In accordance with embodiments, motion sensor module 140 can be inserted into an empty aperture of the second body portion. The motion sensor can detect movement and provide a trigger to activate one or more of the lighting modules. For example, in low traffic areas the luminaire output can be dimmed or eliminated when there is no movement on the roadway, sidewalk, and/or bicycle path.

In accordance with embodiments, communication module 160 can be mounted in the second body portion. The communication module can be used to provide remote control (and programming) to the other functional modules of the luminaire. Also, the communication module can conduct one-way and two-way communication with a remote server to receive control signals, and upload status reports, and other data. The communication module can be implemented in any communication technology available (e.g., WiFi, RF mesh, power line spread spectrum, cellular, etc.).

In accordance with embodiments, modules have the same size and customers can customize the configuration of the luminaire to meet various traffic conditions and usage. Apertures in the second body portion can be punched out in advance, or have perforated perimeters where the aperture material is removed on-site as the luminaire is installed based on its configuration. Because the luminaire is customizable to be applied to different conditions the associated manufacturing, inventory, and handling costs are reduced.

Figure 2:
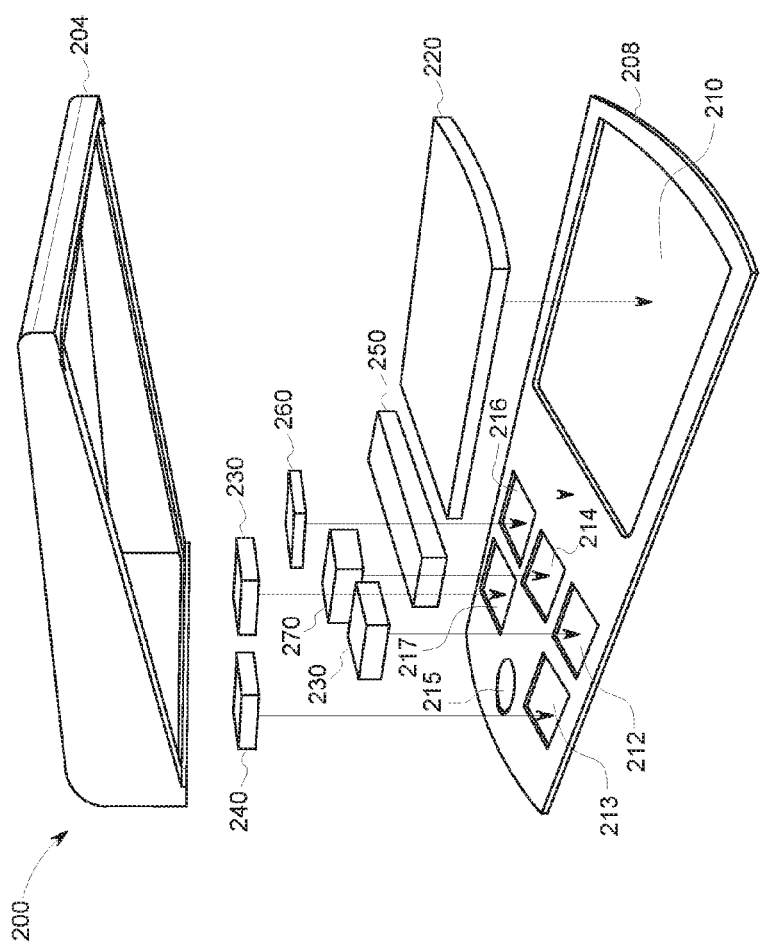
FIG. 2 depicts an exploded view of a customizable modular luminaire in accordance with another embodiment.

FIG. 2 depicts an exploded view of luminaire 200 in accordance with embodiments. Luminaire 200 can include a body having first body portion 204 and second body portion 208. The luminaire second body portion can include two or more apertures 210, 212-217. The apertures are sized to fit correspondingly-sized function modules. These function modules can be lighting component(s), motion sensor(s), camera module(s), communication module(s), and/or other functional devices.

In accordance with embodiments, aperture 210 can be sized to accommodate main lighting module 220 that emits a broad lighting pattern to light, for example, a portion of a roadway. That is, a "broad lighting pattern" may be defined as a lighting pattern adapted to provide lighting to at least a portion of a roadway, as effected by, e.g., suitable optical elements. Main lighting module 220 can generate light from a variety of lighting technologies including a halogen light source, a LED light source, a fluorescent light source, etc. Electrical component 250 can include electrical circuitry to provide the electrical input to the lighting technology of the main lighting module (e.g., a ballast, transformer, driver circuit, etc.). In accordance with an implementation, the power conversion electronics can be located adjacent to the aperture for each component.

Aperture 212-217 can be sized to accept correspondingly-sized function modules. In accordance with embodiments, secondary lighting module 230 can be inserted into one of the aperture(s). In one implementation the secondary light module beam pattern can have a wide, longitudinal light distribution shape. In accordance with embodiments, more than one secondary lighting module can be installed into second body portion 108.

In accordance with embodiments, motion sensor module 240 can be inserted into an empty aperture of the second body portion. The motion sensor can detect movement and provide a trigger to activate one or more of the lighting modules. Communication module 260 can be mounted in the second body portion. The communication module can be used to provide remote control (and programming) to the other functional modules of the luminaire.

In accordance with embodiments, modules can have the same size and customers can customize the configuration of the luminaire to meet various traffic conditions and usage. In accordance with embodiments, modules 230-270 can each be the same size. By way of example, these modules can be camera modules, air pollution sensors, bio-hazard sensors, etc. Data from the sensors can be uploaded via the communication module.

In one implementation, a camera module can be mounted in the luminaire. The camera module can be configured to be selectively activated by a control unit (located as another module, or integral to the camera unit). Upon receiving an activation signal from the control unit, the camera module can photograph a vehicle committing a traffic infraction (not obeying traffic signals, making improper lane changes, speeding, etc.). Further the control unit can selectively activate the camera module to photograph a vehicle based on a license plate recognition algorithm, and/or an identity signal associated with a transponder located in the vehicle.

In another implementation, air pollution can be a hazard along a busy road. By mounting an air pollution sensor module and a communication module in the luminaire, alarm messages can be sent if the air pollution sensor monitors a contaminant level that exceeds the regulation limit. The communication module can transmit the received levels to a remote server.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A luminaire comprising:
    a housing comprising a body portion including two or more apertures;
    a light emitting diode light source accommodated in at least one of the two or more apertures being sized to match a main lighting component;
    a sensor module selected from motion sensor, camera module, air pollution sensor, and biohazard sensor accommodated in at least one other of the two or more apertures being sized to match the sensor module; and
    a communication module accommodated in at least another one of the two or more apertures being sized to match the communication module.

2. The luminaire of claim 1, wherein the light emitting diode light source emits a lighting pattern adapted to provide lighting to at least a portion of a roadway.

3. The luminaire of claim 1, wherein the sensor module is a motion sensor configured to detect motion adjacent to a roadway illuminated by the main lighting component, and to activate the light emitting diode light source upon detection of motion adjacent to the roadway.

4. The luminaire of claim 1, wherein the sensor module is an air pollution sensor.

5. The luminaire of claim 4, wherein the communication module is configured to receive air contaminant levels from the air pollution sensor and to transmit the received levels to a remote central server.

6. The luminaire of claim 1 including:
    three or more function modules, wherein a corresponding number of the two or more apertures are sized to match respective sizes of the three or more function modules; and
    at least two of the three or more function modules each include a lamp.

7. The luminaire of claim 1, wherein the communication module is configured to conduct communication with a remote server to receive control signals.

8. The luminaire of claim 7, wherein the communication module is configured to provide remote control or programming to a sensor module of the luminaire.

9. The luminaire of claim 1, wherein the sensor module is biohazard sensor.

* * * * *